US007550934B1

(12) United States Patent
Deng et al.

(10) Patent No.: US 7,550,934 B1
(45) Date of Patent: Jun. 23, 2009

(54) LED DRIVER WITH FAST OPEN CIRCUIT PROTECTION, SHORT CIRCUIT COMPENSATION, AND RAPID BRIGHTNESS CONTROL RESPONSE

(75) Inventors: Qi Deng, San Jose, CA (US); Weiguang Qiu, Fremont, CA (US)

(73) Assignee: Micrel, Inc., San Jose, CA (US)

( * ) Notice: Subject to any disclaimer, the term of this patent is extended or adjusted under 35 U.S.C. 154(b) by 0 days.

(21) Appl. No.: 12/061,583

(22) Filed: Apr. 2, 2008

(51) Int. Cl.
*H05B 37/02* (2006.01)

(52) U.S. Cl. .................. 315/308; 315/209 R; 315/247; 315/312

(58) Field of Classification Search ............. 315/185 R, 315/193, 209 R, 224–226, 246–247, 291, 315/294, 307–308, 312; 345/46, 84, 90, 345/204
See application file for complete search history.

(56) References Cited

U.S. PATENT DOCUMENTS

| | | | | |
|---|---|---|---|---|
| 7,423,389 B2 * | 9/2008 | Lee | ............................ | 315/308 |
| 7,439,945 B1 * | 10/2008 | Awalt et al. | .................... | 345/83 |
| 2007/0114951 A1 * | 5/2007 | Tsen et al. | .................. | 315/291 |
| 2008/0150449 A1 * | 6/2008 | Wang et al. | .................. | 315/291 |

* cited by examiner

*Primary Examiner*—David Hung Vu
*Assistant Examiner*—Tung X Le
(74) *Attorney, Agent, or Firm*—Patent Law Group LLP; Brian D. Ogonowsky

(57) ABSTRACT

An LED driver drives one or more strings of series-connected LEDs. A feedback voltage at a sense resistor is detected by an op amp, and the op amp controls the conductivity of a MOSFET in series with the LEDs to regulate the peak current. The MOSFET is also controlled by a PWM brightness control signal to turn the LEDs on and off at the PWM duty cycle. A boost regulator provides an output voltage to the string of LEDs. A divided voltage at the end of the string of LEDs is regulated by the boost controller to keep the divided voltage constant. When an LED becomes an open circuit, the boost regulator controller is immediately decoupled from the regulator's switching transistor. If an LED shorts, the boost regulator reduces its output voltage, and the duty cycle of the brightness control signal is automatically increased.

24 Claims, 2 Drawing Sheets

LED DRIVER WITH FAST OPEN CIRCUIT PROTECTION, SHORT CIRCUIT COMPENSATION, AND RAPID BRIGHTNESS CONTROL RESPONSE

FIELD OF THE INVENTION

This invention relates to light emitting diode (LED) drivers.

BACKGROUND

LEDs are rapidly replacing incandescent bulbs, fluorescent bulbs, and other types of light sources due to their efficiency, small size, high reliability, and selectable color emission. A typical forward voltage drop for a high power LED is about 3-4 volts. The brightness of an LED is controlled by the current through the LED, which ranges from a few milliamps to an amp or more, depending on the type of LED. For this reason, LED drivers typically include some means to control the current.

In applications where high brightness is needed, many LEDs are used. It is common to connect LEDs in series, since the current through all the LEDs in series will be the same. Redundant drivers and strings may also be incorporated for added reliability and increased brightness. Serial strings of LEDs may also be connected in parallel so as to limit the required driving voltage level and provide redundancy.

In some applications, there may be 25 or more LEDs connected in series, requiring a driving voltage of about 90 volts (about 25×3.5 volts). Such high voltages require components with a breakdown voltage well in excess of 90 volts.

FIG. 1 is a typical LED driver 10 with a boost topology that drives one or more strings of multiple LEDs D1-D4.

The LEDs' color is slightly dependent on the magnitude of the forward current. Once the forward current is fixed, it should be not changed in order to avoid color shift.

A series resistor 14 is connected in-between the LEDs D1-D4 and ground. The feedback voltage (VFB) at the resistor R14 is the LED current times the resistance of resistor R14.

A pulse-width modulation (PWM) brightness control signal 16 has a relatively low frequency (e.g., 100 Hz-1000 Hz) and effectively enables the boost regulator at the LF PWM duty cycle. The brightness control signal 16 is divided by resistors R18 and R19. The magnitude of the high state PWM voltage is $V_{BRIGHT}$. The divided voltage is $V_{BRIGHT} \times R18/(R19+R18)$. The divided voltage and VFB are applied to inputs of an op amp 22, acting as an error amplifier. The feedback loop of the boost regulator causes the output voltage (VOUT) of the regulator, applied to the LED string, to be of a level to maintain VFB at $V_{BRIGHT} \times R18/(R19+R18)$. Therefore, the forward current $I_{LED}$ through the LEDs when $V_{BRIGHT}$ is high is $V_{BRIGHT} \times R18/((R19+R18)*R14)$.

A capacitor 24 at the output of the op amp 22 provides a relatively stable voltage while $V_{BRIGHT}$ is high. The voltage at capacitor 24, when $V_{BRIGHT}$ is high, determines the duty cycle of a high frequency PWM signal controlling a MOSFET switch 26. The PWM signal will typically be an HF signal between a few hundred KHz and a few MHz to keep component sizes and voltage ripple small. If VFB is too high, charge is removed from capacitor 24 to lower the capacitor 24 voltage. If VFB is too low, charge is added to capacitor 24 to increase the capacitor 24 voltage.

An oscillator 30 generates a sawtooth pattern at a fixed frequency, such as 1 MHz. A PWM comparator 32 compares the ramped oscillator signal to the capacitor 24 voltage. When the ramp cycle begins, the PWM output of the comparator 32 is high, turning on the switch 26. When the ramp voltage crosses the capacitor 24 voltage, the output of the PWM comparator 32 goes low, shutting off the switch 26. The resulting duty cycle of switch 26 maintains the inputs to op amp 22 approximately equal when $V_{BRIGHT}$ is high.

A MOSFET driver 36 receives the HF PWM signal and level-shifts the PWM signal, if necessary, to turn the switch 26 on and off in accordance with the PWM signal. While the switch 26 is generating HF pulses, a smoothing capacitor 38 maintains the VOUT and the current through the LEDs relatively constant. An inductor L1 and diode D0 operate in a well known manner to charge the capacitor 38 to a voltage above the power supply input voltage VDD and supply current to the LEDs during each switching cycle.

A capacitor 40 smoothes the power supply voltage VDD applied to the VIN pin of the integrated circuit LED driver 10. An external ENABLE signal, coupled to the EN pin of the LED driver 10, can be used to enable or disable the switch 26.

The external PWM low frequency brightness control signal 16 adjusts the brightness level of the LEDs D1-D4 by adjusting the overall duty cycle of the boost regulator. The frequency of the LF_PWM signal may be on the order of 100 Hz or higher to prevent noticeable flicker of the LEDs. There may be thousands of HF pulses generated by the boost regulator during each pulse (on-time) of the LF_PWM signal. When the low frequency signal LF_PWM goes low and the HF pulses are stopped, VOUT drops below the forward voltage of the LEDs volts to turn off the LEDs until the LF_PWM signal goes high again. In this way, the current through the LEDs is either a peak current or zero current. This keeps the emitted color of the LEDs constant, but enables the perceived brightness to be adjusted by the LF_PWM duty cycle.

If one of more of the LEDs becomes an open circuit, the forward current through the LEDs disappears, and therefore VFB will drop to ground level. The regulator's feedback loop will interpret this as a drop in VOUT. The op amp 22 will source more current (increase the error signal), causing the boost regulator to increase the duty cycle of the HF_PWM signal to increase the VOUT. Since the VFB will never rise because of the open LED condition, VOUT will keep climbing (a runaway condition). If there were no overvoltage protection, the increasing voltage would damage components and become a safety hazard.

To prevent such VOUT runaway failure from happening, a typical solution is put a resistor divider (R42 and R43) between VOUT and ground, in parallel to the LEDs and R14. The divided voltage is applied to an input of a comparator 46 whose other input is connected to VREF, which sets the Over Voltage Protection (OVP) level. When an open LED condition occurs and the VOUT starts rising, it will eventually rise above the OVP level, at which point the comparator 46 output will be asserted. The asserted output of comparator 46 will then shut down the MOSFET driver 36, causing the switch 26 to shut off and VOUT to decrease as the charge in the capacitor 38 is discharged through the LEDs and through R42 and R43.

There are three problems with the above typical solution:

1. The Over Voltage Protection (OVP) does not provide timely protection. This is because when an open LED condition occurs, the VOUT will still have to rise to the predetermined OVP level to activate the OVP circuit. This could be a long delay. By the time the switch 26 is finally turned off, VOUT may have already risen to a voltage that is higher than the OVP level and caused some irreversible damage.

2. If one or more LEDs shorts out, the forward voltage increases through the remaining LEDs, and the current increases. Due to the feedback loop, VOUT will be regulated downward to keep a predetermined current flowing through the LEDs. However, the LED driver 10 does not detect that certain LEDs are not longer operating, so the brightness level remains reduced.

3. The LED brightness change is not timely due to the delay incurred by the boost regulator being effectively enabled and disabled by the brightness control signal 16. The delay introduced causes brightness change delays between command and result and effectively causes the duty cycle of the LF_PWM signal to not match the duty cycle of the LEDs.

What is needed is an LED driver that does not have the above drawbacks of conventional LED drivers.

SUMMARY

An LED driver is disclosed that drives one or more strings of series-connected LEDs.

The solution to the problem 1 relating to overvoltage protection when there is an open circuit is as follows.

A low value sense resistor is connected between an end of the series string of LEDs and ground. The voltage at the sense resistor is connected to an inverting input of a comparator, and a non-inverting input is connected to a reference voltage. The output of the comparator is connected to a MOSFET driver for an HF switching transistor. The MOSFET driver and switching transistor are part of a switching regulator for regulating the voltage applied to the string of LEDs. When an LED becomes an open circuit, the voltage at the sense resistor goes low, and the output of the comparator goes high. The high signal controls the MOSFET driver to turn off the switching transistor so that VOUT cannot be increased. In contrast, conventional LED drivers detect an overvoltage condition, which takes time to occur after the open circuit is created, before shutting down the regulator. By using the inventive driver, there is no overvoltage that may damage components or be dangerous. Since strings of LEDs may be driven by voltages of 100 volts or more, limiting the voltage is a very important concern.

The solution to the problem 2 relating to shorted LEDs is as follows.

A high value resistor divider is connected between ground and the end of the series string of LEDs. The resistor values are high so as not to draw significant current. The end of the series string of LEDs provides a voltage (VLED). The divided voltage is connected to one input of an error amplifier, and a second input is connected to a reference voltage. The output of the error amplifier is part of a boost regulation feedback loop that maintains VLED at a predetermined level, such that if one or more LEDs fail and become short circuits, the VLED will remain constant by the regulator reducing VOUT to compensate for the lower forward voltage needed to energize the remaining LEDs. The magnitude of the error amplifier output, connected to a capacitor, may be monitored by an external circuit to detect how many LEDs have shorted so that remedial action may be taken, such as increasing the brightness control signal duty cycle to compensate for the failed LEDs.

The solution to the problem 3 relating to the lack of brightness control is as follows.

An external PWM brightness control signal for the LEDs controls the on and off duty cycle of a MOSFET connected in series with the LEDs and just upstream from the low value sense resistor (mentioned above), so the duty cycle brightness control is substantially instantaneous. When the MOSFET is turned off, the current path to ground is broken so the LEDs are turned off. When the MOSFET is turned back on, the predetermined peak current flows through the LEDs once VOUT exceeds the forward voltage of the LEDs.

Instead of the brightness control signal directly controlling the MOSFET, the brightness control signal directly controls a pass transistor to selectively couple a variable gate voltage to the MOSFET. As described below the variable gate voltage to the MOSFET controls the peak current through the LEDs.

A feedback voltage at the low value sense resistor is connected to an inverting input of an op amp, and the non-inverting input is connected to a reference voltage. The feedback voltage is proportional to the current through the LEDs. The output of the op amp is connected to a terminal of the pass transistor controlled by the brightness control signal, and the other terminal of the pass transistor is connected the gate of the MOSFET, described above for its use in brightness control. The feedback loop causes the op amp to provide a gate voltage level to the MOSFET sufficient to keep the feedback voltage approximately equal to the reference voltage so that the current through the LEDs is regulated. Any difference between VLED and the feedback voltage is dropped across the MOSFET. VLED is kept relatively low so that there is little power dissipation across the MOSFET.

Additionally, a zener diode connected between VLED and ground protects the brightness control MOSFET from any high voltage spikes caused by shorting LEDs.

Although an embodiment of the invention has been summarized above, the scope of the invention is defined by the claims.

BRIEF DESCRIPTION OF THE DRAWINGS

Elements that are the same or equivalent in the figures are identified with the same numeral.

DETAILED DESCRIPTION

Figure 2:
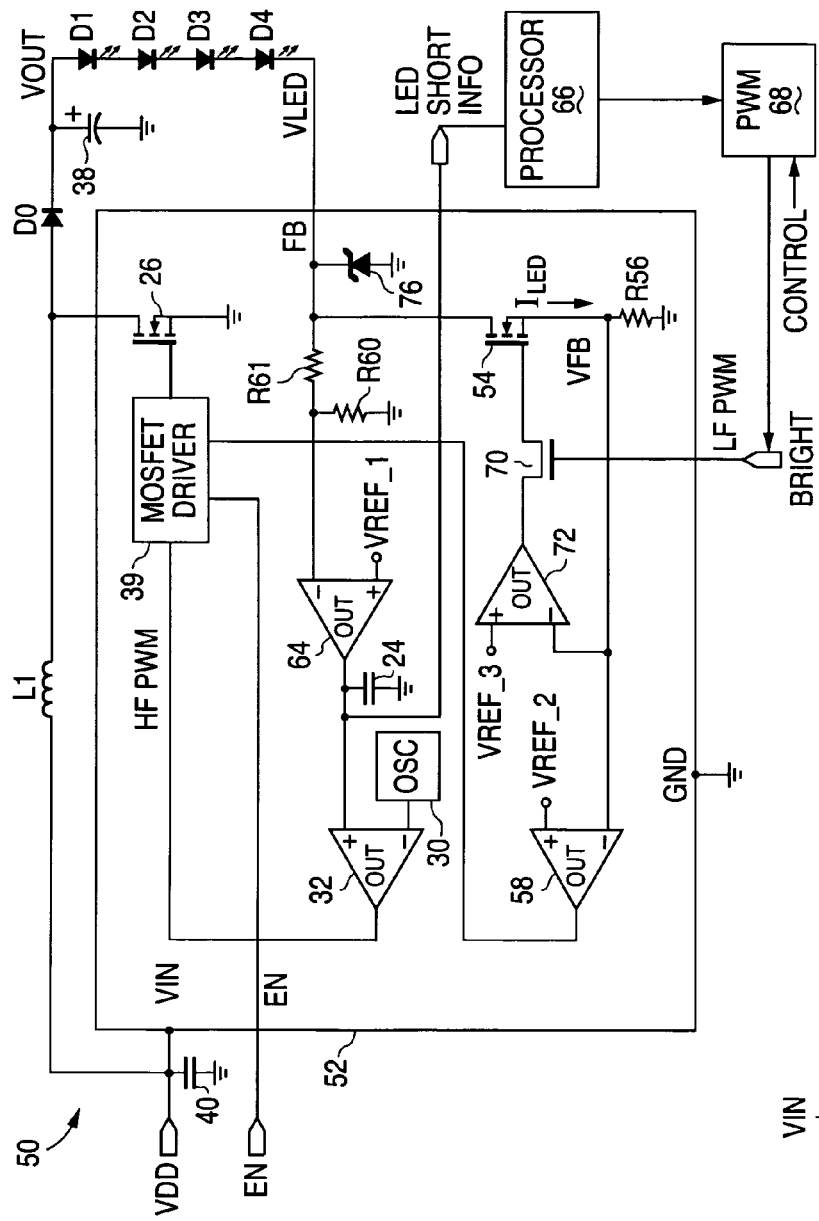
FIG. 2 illustrates an LED driver in accordance with one embodiment of the invention.

FIG. 2 illustrates an embodiment of an LED driver 50 in accordance with the present invention. An input voltage (VDD) is applied to a terminal of an integrated circuit 52 that contains the components shown within the box.

A conventional boost regulator portion of the driver 50 comprises HF oscillator 30 (outputting a sawtooth waveform), PWM comparator 32, MOSFET switch 26, capacitor 38, inductor L1, and diode D0, which operate in a known manner to vary the output voltage (VOUT) by controlling the PWM duty cycle of switch 26 in response to a feedback signal. VOUT is varied to maintain the voltage (VLED) at the end of the LED string at a predetermined level. Diode D0 may instead be a synchronous rectifier.

The PWM pulses controlling switch 26 will typically be a high frequency signal between a few hundred KHz and a few MHz to keep component sizes and voltage ripple small. Switch 26 is shown as a MOSFET; however, the transistor may be any type of switch, such as a bipolar transistor. Any number of LEDs in series may be driven, and the forward voltage may exceed 100 volts.

When switch 26 is on, the inductor L1 is charging and the diode D0 is off. When switch 26 is turned off, the voltage at the diode D0 goes high so that the diode D0 conducts. The energy stored in the inductor L1 is then transferred to the LEDs D1-D4 and into the smoothing capacitor 38. The MOS- FET driver 39 level-shifts the boost regulator PWM pulses, if necessary, and performs a logic function to control the switch 26.

A MOSFET 54 is shown in series with the LEDs D1-D4, selectively coupling the LEDs to ground via a low value (e.g., <1 ohm) sense resistor R56. Assuming MOSFET 54 is on, the current through the forward-biased LEDs ($I_{LED}$) flows through the sense resistor R56. A feedback voltage VFB at the sense resistor R56 is applied to an inverting input of a comparator 58, where VFB=$I_{LED}$×R, and where R is the resistance of resistor R56. A non-inverting input of the comparator 58 is connected to a reference voltage VREF_2, which is a fixed voltage of a magnitude above zero volts but below a normal VFB encountered when none of the LEDs is an open circuit.

If one of the LEDs D1-D4 fails and becomes an open circuit (or if MOSFET 54 is off), VFB will be zero volts. Additionally, if there is an open circuit, VLED will be zero volts. Due to VFB being zero volts, the output of comparator 58 will then go high. The output of comparator 58 is connected to the MOSFET driver 39. The high comparator 58 output overrides the regulator's PWM signal to the switch 26 and keeps the switch 26 in an OFF state. Therefore, when there is an open circuit, even though the regulator will try to raise VLED by increasing the PWM duty cycle of the switch 26, such PWM signals are decoupled from the switch 26, and VOUT does not rise.

As seen, in contrast to the prior art, no overvoltage condition is created upon an open circuit occurring. This protects components and is safer.

Another aspect of the LED driver 50 is its ability to detect shorted LEDs and compensate for the shorted LEDs.

Figure 1:
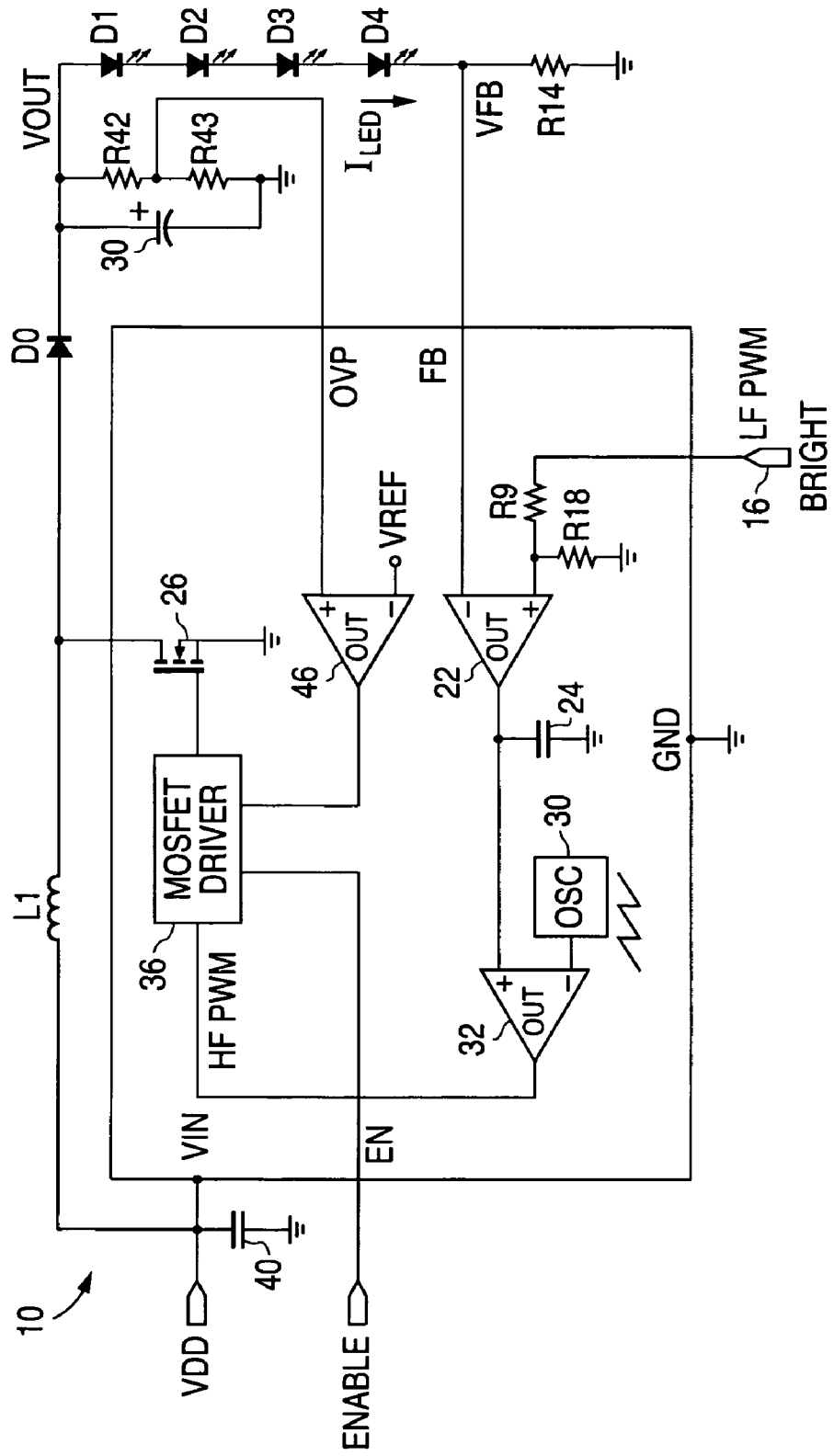
FIG. 1 illustrates a prior art LED driver.

High value resistors R60 and R61 form a resistor divider connected between ground and the end of the series string of LEDs. The resistor values are high so as not to draw significant current. The end of the series string of LEDs provides a voltage VLED. The divided voltage is connected to an inverting input of an op amp 64 (an error amplifier), and a non-inverting input is connected to a reference voltage VREF_1. The output of the op amp 64 is connected to a capacitor 24. As a result of the boost regulator's feedback loop, the voltage at the capacitor 24 is that needed to keep the inputs into the op amp 64 approximately equal. If the divided voltage (proportional to VLED) rises above VREF_1, the op amp 64 removes charge from the capacitor 64 to reduce its voltage and lower the PWM duty cycle, which lowers VOUT and VLED. If the divided voltage goes below VREF_1, the op amp 64 adds charge to the capacitor 64 to raise its voltage and increase the PWM duty cycle, which increases VOUT and VLED. The operations of the oscillator 30, PWM comparator 32, and the other boost regulator components have been discussed with reference to FIG. 1.

Op amps are differential amplifiers that have a controlled amplification, typically using negative feedback.

Since the boost regulator maintains VLED at a predetermined level, then if one or more LEDs fail and become short circuits, VLED suddenly rises due to the lowered forward voltage drop, and the regulator reduces VOUT so that VLED remains constant. The magnitude of the change in voltage at the capacitor 24 when the shorts occur is related to the change in forward voltage. This capacitor 24 voltage may be monitored by an external processor 66 to detect how many LEDs have shorted so that corrective action may be taken, such as identifying that maintenance is needed or increasing the brightness control signal duty cycle to compensate for the failed LEDs. For example, if two out of ten LEDs become shorts, the processor 66 may control a PWM brightness control unit 68 to increase its duty cycle by 20% to increase the brightness of the working LEDs. If too many LEDs have shorted, the processor 66 may simply shut down the driver 50 for maintenance. The processor 66 may be any control circuit, such as a logic circuit.

The predetermined level of VLED is a preferably a relatively low value sufficient to ensure the proper operation of the MOSFET 54 at the peak current level. Since a voltage drop across MOSFET 54 that is higher than needed for operating the MOSFET 54 in the linear range wastes power, VLED is controlled to be a low value. VOUT will be greater than VLED by the combined forward drops of the LEDs when operating at their intended peak current.

Another aspect of the LED driver 50 is its ability to more accurately control the perceived brightness of the LEDs.

To control the brightness of the LEDs D1-D4, the average current through the LEDs is controlled by pulse-width modulation (PWM), where the duty cycle (on time vs. total time) of the pulses determines the average current. The peak current through the LEDs remains constant to keep the emitted color constant, since an LED's color emission is slightly affected by the current. For example, if the duty cycle were 50%, the average current would be half of the peak current when the LEDs are on. Thus, the perceived brightness of the LEDs would be about half the brightness of the LEDs when fully on. The PWM signal is typically generated by an oscillator/controller (in unit 68) generating a relatively low fixed frequency, where the duty cycle is controlled by, for example, the user turning a rheostat or automatically controlled by processor 66. The PWM frequency may be, for example, 100 Hz-1 kHz, so the light flicker is not perceptible.

The brightness control PWM input terminal of the integrated circuit 52 is connected to a gate of a pass transistor 70 (e.g., a JFET or MOSFET) so that a high state PWM signal turns on transistor 70, and a low state PWM signal turns off transistor 70. One terminal of transistor 70 is connected to the output of an op amp 72, which outputs a regulated gate voltage to set the peak current through the LEDs (discussed below). The other terminal of transistor 70 is connected to the gate of MOSFET 54. When transistor 70 is turned on by the PWM signal, MOSFET 54 is turned onto couple current through the LEDs D1-D4. When transistor 70 is turned off by the PWM signal, MOSFET 54 is turned off to prevent current flowing through the LEDs. Thus, the perceived brightness of the LEDs D1-D4 is directly controlled by the incoming PWM signal so there is no delay, and the duty cycle of the PWM signal is directly correlated to the duty cycle of the LEDs for very accurate brightness control.

When MOSFET 54 is off, it will cause VFB to go low. This triggers comparator 58 (previously discussed) to cause the MOSFET driver 39 to keep the switch 26 off during the time that the MOSFET 54 is off. So VOUT is not regulated when the MOSFET 54 is off and decays to VDD if the switch 26 is disable long enough.

When MOSFET 54 turns back on, the comparator 58 output will go low, and the regulator will supply HF PWM pulses to the switch 26 to maintain VLED at the predetermined level. As seen, there is synergy between the open circuit detector and the brightness control circuitry.

The op amp 72 also operates to regulate the peak current through the LEDs. VFB is connected to an inverting input of op amp 72, and reference voltage VREF_3 is connected to a non-inverting input of op amp 72. The feedback voltage VFB at the low value sense resistor R56 is proportional to the current through the LEDs. The output of the op amp 72 is connected to a terminal of the pass transistor 70, controlled by the brightness control signal, and the other terminal of the pass transistor 70 is connected the gate of the MOSFET 54, described above for its use in brightness control. The feedback loop causes the op amp 72 to provide a gate voltage to the MOSFET 54 sufficient to keep VFB approximately equal to VREF_3 so that the current through the LEDs is regulated by the conductivity of the MOSFET 54. The regulated peak current is set within the LED manufacturer's suggested range for high brightness and long life. Any difference between VLED and the feedback voltage is dropped across the MOSFET. VLED is kept relatively low so that there is little power dissipation across the MOSFET.

A zener diode 76 connected between VLED and ground protects the MOSFET 54 from any high voltage spikes caused by shorting LEDs. For example, if MOSFET 54 can withstand 12 volts, zener diode 76 may be selected to conduct at 9 volts to avoid possible damage to the MOSFET 54. Typically, VLED is a low voltage, but may spike if multiple LEDs short simultaneously. VLED will then be regulated to go low again.

The various functions performed by the circuit of FIG. 2 may be performed by circuits different from the ones shown in FIG. 2. Other types of transistors and amplifiers may be used, and polarities may be the opposite.

An enable pin is also provided on the integrated circuit 52 that shuts down the MOSFET driver 39 upon the enable signal being asserted. Asserting such an enable signal may also operate to terminate power to the various components in the integrated circuit 52 to disable them.

Figure 3:
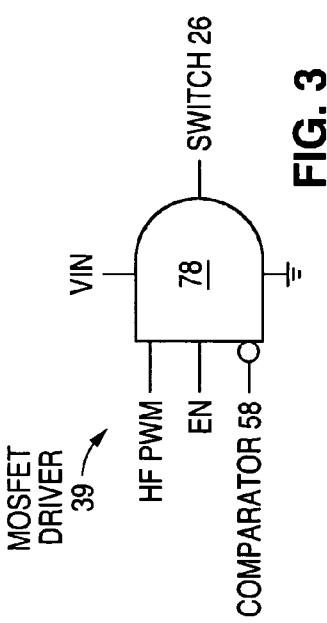
FIG. 3 illustrates one of the many types of MOSFET drivers that can be used in FIG. 2.

FIG. 3 illustrates a simple MOSFET driver 39 that may be used in FIG. 2. An AND gate 78 receives the HF PWM signal from the PWM comparator 32, the enable signal, and an inverted signal from the comparator 58. The AND gate's high output voltage turns on switch 26, and the AND gate's low voltage (e.g., ground) turns off the switch 26. Although the MOSFET driver 39 is shown as a logic circuit, it may be implemented in any way to achieve the overall function represented by the AND gate.

The various components may be coupled together by direct wiring, or via resistors, or via buffers, or via level shifters, or via inverters, or via other components in order to properly operate. The various comparators may be hysteresis comparators to avoid oscillations, wherein a threshold for asserting a comparator output is slightly different from a threshold for deasserting the comparator output. The polarities of any comparator and op amp inputs may be the opposite with suitable changes in any affected logic circuits.

The invention is not limited to the boost topology. It also applies to buck, SEPIC, and Cuk topologies, as well as isolated topologies such as flyback, forward, and other topologies. Multiple strings of LEDs may be connected in parallel to the LED driver.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A light emitting diode (LED) driver for driving a plurality of LEDs connected in series, the driver comprising:
a current regulator controller receiving a first feedback voltage corresponding to a current through the LEDs;
a first transistor coupled in series with the LEDs, the first transistor being controlled by the current regulator controller to maintain a substantially constant current through the LEDs when the LEDs are conducting;
a second transistor having a control terminal coupled to receive a brightness control signal, the second transistor being coupled between the current regulator controller and the first transistor for selectively decoupling an output of the current regulator controller from the first transistor to turn the LEDs on and off at a duty cycle corresponding a duty cycle of the brightness control signal;
the plurality of LEDs connected in series having a first end coupled to an output voltage of a voltage regulator and having a second end providing a second feedback voltage to the voltage regulator, the voltage regulator maintaining the second feedback voltage at a substantially constant level by adjusting the output voltage, the voltage regulator comprising a voltage regulator controller having an output for providing pulse-width modulated (PWM) pulses, the voltage regulator further comprising a switching transistor coupled to receive the PWM pulses, a duty cycle of the switching transistor determining the output voltage coupled to the first end of the LEDs; and
an open circuit detection circuit connected to receive the first feedback signal, the detection circuit detecting a level of the first feedback signal, wherein if the first feedback signal is above a first threshold, the detection circuit couples the PWM pulses to the switching transistor, and if the first feedback signal falls below a second threshold, the detection circuit decouples the PWM pulses from the switching transistor, such that the switching transistor is not switched by the PWM pulses in the event of an open circuit in the plurality of LEDs connected in series.

2. The driver of claim 1 wherein the first threshold approximately equals the second threshold.

3. The driver of claim 1 wherein the open circuit detector comprises:
a logic circuit connected to selectively couple the PWM pulses at the output of the voltage regulator controller to a control terminal of the switching transistor; and
a comparator receiving the first feedback signal and a reference voltage, an output of the comparator being coupled to the logic circuit for causing the logic circuit to couple the PWM pulses to the control terminal of the switching transistor when the first feedback signal is above the reference voltage and for causing the logic circuit to decouple the PWM pulses from the control terminal of the switching transistor when the first feedback signal is below the reference voltage,
the comparator and logic circuit preventing switching of the switching transistor in the event of an open circuit in the plurality of LEDs connected in series.

4. The driver of claim 1 wherein the voltage regulator comprises a boost regulator.

5. The driver of claim 4 wherein the boost regulator comprises an oscillator, an error amplifier receiving the second feedback signal, and a comparator having inputs connected to an output of the oscillator and an output of the error amplifier for generating the PWM pulses.

6. The driver of claim 1 further comprising a sense resistor in series with the LEDs, a terminal of the sense resistor providing the first feedback voltage, wherein the current regulator controller comprises a differential amplifier having a first terminal connected to a reference voltage and a second terminal connected to the sense resistor, an output of the differential amplifier regulating current through the first transistor.

7. The driver of claim 1 further comprising a processor connected to the voltage regulator, the processor detecting changes in a voltage regulator signal to determine shorting of one or more of the LEDs.

8. The driver of claim 7 wherein the processor controls a brightness controller to increase a duty cycle of the brightness control signal upon detection of a short of at least one of the LEDs.

9. The driver of claim 7 wherein the voltage regulator comprises an error amplifier receiving the second feedback signal, an input of the processor being coupled to receive a signal at an output of the error amplifier.

10. The driver of claim 1 wherein the second feedback voltage is a voltage divided from a voltage at the second end of the LEDs, wherein the second end of the LEDs is connected to a terminal of the first transistor, and wherein the voltage regulator regulates a level of voltage at the second end of the LEDs so as to be above a voltage needed for proper operation of the first transistor and the open circuit detection circuit.

11. The driver of claim 1 further comprising a zener diode connected to a terminal of the first transistor.

12. The driver of claim 1 further comprising an output circuit connected to the switching transistor, the output circuit comprising:
- an inductor connected between a supply voltage and the switching transistor;
- a diode having an anode connected to the switching transistor; and
- a smoothing capacitor connected to a cathode of the diode, a terminal of the capacitor being an output terminal of a boost regulator providing the output voltage to the plurality of LEDs.

13. The driver of claim 1 further comprising the plurality of LEDs coupled to the output voltage.

14. The driver of claim 1 wherein the driver is formed as an integrated circuit.

15. A method for driving a plurality of light emitting diodes (LEDs) connected in series, the plurality of LEDs connected in series having a first end and a second end, the method comprising:
- regulating a current through the LEDs by a current regulator controller, the current regulator controller receiving a first feedback voltage corresponding to a current through the LEDs and controlling conductivity of a first transistor connected in series with the LEDs;
- controlling a second transistor by a brightness control signal, the second transistor being coupled between the current regulator controller and the first transistor for selectively decoupling an output of the current regulator controller from the first transistor to turn the LEDs on and off at a duty cycle corresponding to a duty cycle of the brightness control signal;
- regulating a voltage at the second end of the plurality of LEDs by a voltage regulator, the first end of the plurality of LEDs connected to an output voltage of the voltage regulator, the second end providing a second feedback voltage to the voltage regulator, the voltage regulator maintaining the second feedback voltage at a substantially constant level by adjusting the output voltage, the voltage regulator generating pulse-width modulated (PWM) pulses for controlling a switching transistor, a duty cycle of the switching transistor determining the output voltage coupled to the first end of the LEDs; and
- receiving the first feedback signal by an open circuit detection circuit, the detection circuit detecting a level of the first feedback signal,
  - wherein if the first feedback signal is above a first threshold, the detection circuit couples the PWM pulses to the switching transistor,
  - and wherein if the first feedback signal falls below a second threshold, the detection circuit decouples the PWM pulses from the switching transistor, such that the switching transistor is not switched by the PWM pulses in the event of an open circuit in the plurality of LEDs connected in series.

16. The method of claim 15 wherein the first threshold approximately equals the second threshold.

17. The method of claim 15 wherein receiving the first feedback signal by an open circuit detection circuit and detecting a level of the first feedback signal comprises:
- comparing the first feedback signal to a reference voltage; and
- preventing switching of the switching transistor when the first feedback signal goes below the reference voltage such that the output voltage is not increased in the event of an open circuit in the plurality of LEDs connected in series.

18. The method of claim 15 wherein the voltage regulator comprises a boost regulator.

19. The method of claim 15 wherein the current regulator controller receiving a first feedback voltage comprises a differential amplifier receiving at one input a signal from a sense resistor in series with the LEDs as the first feedback voltage and the differential amplifier receiving at another input a reference voltage, an output of the differential amplifier regulating current through the first transistor.

20. The method of claim 15 further comprising detecting changes in a signal generated within the voltage regulator to determine shorting of one or more of the LEDs.

21. The method of claim 20 further comprising, upon detecting changes in a signal generated within the voltage regulator indicative of shorting of one or more of the LEDs, automatically increasing a duty cycle of the brightness control signal.

22. The method of claim 15 wherein the second feedback voltage is a voltage divided from a voltage at the second end of the LEDs, wherein the second end of the LEDs is connected to a terminal of the first transistor, and wherein the voltage regulator regulates a level of voltage at the second end of the LEDs so as to be above a voltage needed for proper operation of the first transistor and the open circuit detection circuit.

23. A light emitting diode (LED) driver for driving a plurality of LEDs connected in series, the driver comprising:
- a current regulator controller receiving a first feedback voltage corresponding to a current through the LEDs;
- a first transistor coupled in series with the LEDs, the first transistor being controlled by the current regulator controller to maintain a substantially constant current through the LEDs when the LEDs are conducting;
- the plurality of LEDs connected in series having a first end coupled to an output voltage of a voltage regulator and having a second end providing a second feedback voltage to the voltage regulator, the voltage regulator maintaining the second feedback voltage at a substantially constant level by adjusting the output voltage, the voltage regulator comprising a voltage regulator controller having an output for providing pulse-width modulated (PWM) pulses, the voltage regulator further comprising a switching transistor coupled to receive the PWM pulses, a duty cycle of the switching transistor determining the output voltage coupled to the first end of the LEDs;
- a short circuit detector connected to the voltage regulator, the detector detecting a voltage level within the voltage regulator indicative of one or more of the LEDs shorting out and issuing a signal in response thereto: and an open circuit detection circuit connected to receive the first feedback signal, the detection circuit detecting a level of the first feedback signal, wherein if the first feedback signal is above a first threshold, the detection circuit couples the PWM pulses to the switching transistor, and if the first feedback signal falls below a second threshold, the detection circuit decouples the PWM pulses from the switching transistor, such that the switching transistor is not switched by the PWM pulses in the event of an open circuit in the plurality of LEDs connected in series.

24. The driver of claim 23 wherein the short circuit detector comprises a processor, the driver further comprising a brightness control signal generator that controls a duty cycle of the current through the LEDs, wherein the processor is coupled to the brightness control signal generator and adjusts the duty cycle of the current through the LEDs to compensate for failed LEDs.

* * * * *